United States Patent [19]

Kessler

[11] 4,419,315

[45] Dec. 6, 1983

[54] EXTRUDED FIN-TYPE WEATHERSTRIP

[76] Inventor: Gerald Kessler, 302 McClurg Rd. at Southern Blvd., Box 389, Youngstown, OhioIO 44501

[21] Appl. No.: 409,900

[22] Filed: Aug. 20, 1982

Related U.S. Application Data

[62] Division of Ser. No. 333,912, Dec. 23, 1981.

[51] Int. Cl.³ .......................................... D04H 11/00
[52] U.S. Cl. .................... 264/145; 264/167; 264/177 R; 425/381; 425/465; 428/85
[58] Field of Search .................. 264/177 R, 167, 145, 264/146; 425/465, 466, 381; 428/85

[56] References Cited

U.S. PATENT DOCUMENTS

| | | | |
|---|---|---|---|
| 827,444 | 7/1906 | Herbert, Jr. | 425/465 |
| 2,188,815 | 1/1940 | Murphy | 428/85 |
| 2,280,389 | 4/1942 | Edwards | 189/75 |
| 2,402,281 | 6/1946 | Green | 264/177 R |
| 2,739,359 | 3/1956 | Kunkel | 428/85 |
| 3,178,770 | 4/1965 | Willis | 425/465 |
| 3,193,604 | 7/1965 | Mercer | 425/381 |
| 3,235,439 | 2/1966 | Schultheiss | 428/85 |
| 3,266,190 | 8/1966 | Jackson | 428/85 |
| 3,280,847 | 10/1966 | Chisholm et al. | 425/466 |
| 3,689,617 | 9/1972 | Fairbanks | 264/103 |
| 3,825,459 | 7/1974 | Taylor | 264/177 R |
| 3,844,874 | 10/1974 | Nalle, Jr. | 264/DIG. 81 |
| 3,854,859 | 12/1974 | Sola | 425/381 |
| 3,923,576 | 12/1975 | Lind | 156/244.13 |
| 4,001,366 | 1/1977 | Brumlik | 264/145 |
| 4,083,667 | 4/1978 | Livingston et al. | 425/192 R |
| 4,143,195 | 3/1979 | Rasmussen | 428/116 |
| 4,214,930 | 7/1980 | Burrous | 428/85 |
| 4,233,259 | 11/1980 | Pietratus et al. | 425/465 |
| 4,242,392 | 12/1980 | Yackiw | 428/85 |
| 4,256,685 | 3/1981 | Vassar | 264/167 |

FOREIGN PATENT DOCUMENTS

| | | | |
|---|---|---|---|
| 2926581 | 1/1981 | Fed. Rep. of Germany | 425/465 |
| 1369155 | 8/1963 | France | 264/167 |
| 56-155734 | 12/1981 | Japan | 264/167 |

OTHER PUBLICATIONS

*Popular Science*, "Super-Tight Storm Windows", 12-1981, p. 50.

*Primary Examiner*—Jeffery R. Thurlow
*Attorney, Agent, or Firm*—Browdy and Neimark

[57] ABSTRACT

An integrally extruded all plastic "pile" weatherstrip comprises an elongated longitudinal substrate from which vertically project a plurality of integral, spaced parallel, thin, flexible, deformable, wavy S-configured fin members. The exposed upper ends of all or any desired lesser number of the fin elements may be partially slit to from 20% to 100% of the fin height to control the amount of air and water moisture infiltration through the weatherstrip. The fin element ends are slit at a desired bias angle with respect to a horizontal line lying within a horizontal plane surface in which the fin ends are located. The extrudable plastic is preferably high density polyethylene, polypropylene or polyvinyl chloride and may optionally contain an ultra-violet absorbent composition and a partially compatible lubricant. The wavy fin weatherstrip assembly may be manufactured by unbalancing an extrusion die so that the rate of plastic flow through the fin forming orifices is substantially greater than that occurring at the base or substrate forming orifice. Alternatively, the extrusion die can be built in sections and by oscillating the fin orifice section relative to a fixed base orifice section, or vice versa, the wavy fin configuration is extruded.

13 Claims, 14 Drawing Figures

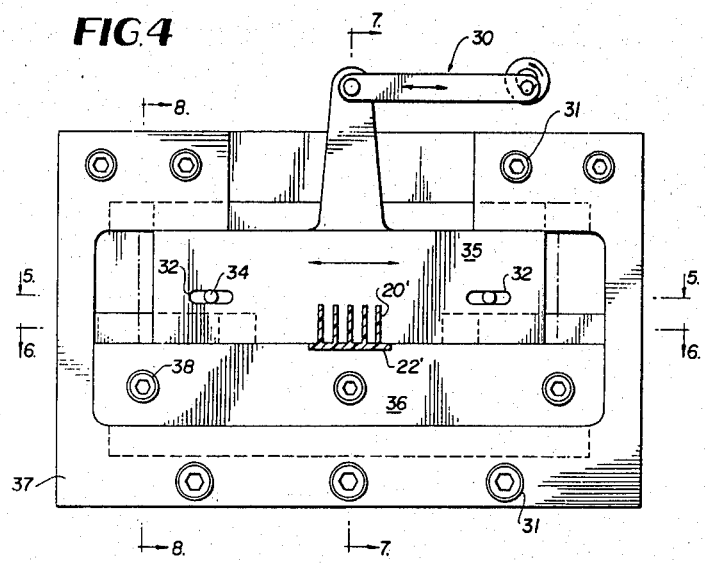
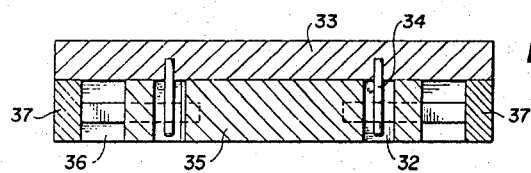
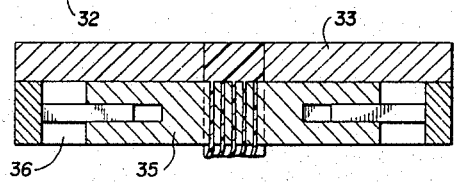
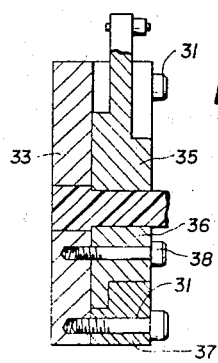
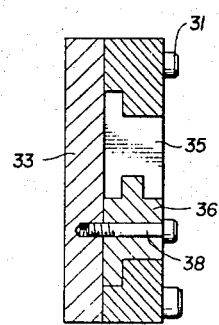

EXTRUDED FIN-TYPE WEATHERSTRIP

This is a division, of application Ser. No. 333,912 filed Dec. 23, 1981.

FIELD OF THE INVENTION

The invention relates generally to weather insulation and, more particularly, to weatherstripping used in conjunction with the sealing of doors and windows. More especially the invention relates to a flexible, resilient integrally extruded plastic pile and substrate weatherstrip material, characterized by vertically projecting wavy fins, and methods for making the same.

BACKGROUND OF THE INVENTION

There are in current use a variety of weatherstrip assemblies, parts of which have been fabricated from extruded plastics or rubbers, and/or which comprise woven substrates or backings adhered by means for various plastic adhesive coating compositions.

Such bonding of the pile to the backing may be accomplished in the presence of an electrostatic field to orient the upstanding pile or by means of sonic bonding. An example of such conventional pile weatherstripping includes woven pile which vertically projects from a woven backing to which the pile is bonded by means of conventionally used plastic adhesive compositions such as polyester or vinyl polymer resins. Another conventionally known type of weatherstripping includes one or more vertically projecting straight fins usually in combination with vertically projecting woven pile, all of which are adhered to a plastic backing by means of adhesives, used alone, or in combination with some type of autogenous bonding, such as sonic bonding.

Manufacture of such conventionally known weatherstrip assemblies require the practice of several complex and costly operations. For example, U.S. Pat. No. 3,266,190 to Jackson discloses a weatherstrip construction particularly useful in sealing small clearance openings associated with aluminum window and door closure elements. This weatherstrip assembly includes a woven cloth backing from which a plurality of parallel cut or uncut pile members project, the base of the pile members being bonded or otherwise secured to the upper surface of said backing and being confined by a pair of shields or baffles. Also see the Lind U.S. Pat. No. 3,923,576.

The U.S. patent to Kunkel, U.S. Pat. No. 2,739,359, on the other hand, discloses an all plastic, elastic weatherstrip assembly comprising a substrate and a few relatively thick elastic rubbery, upwardly projecting, parallel straight ribs, of varying height, which deform to seal off closure openings associated with the cooperation of opposite panels of glass swinging doors.

The U.S. patent to Yackiw, U.S. Pat. No. 4,242,392 discloses a pile-type weatherstrip including two pile sections separated by a straight vertically projecting fin or barrier strip which may be formed of fabric or synthetic material such as polypropylene. Other weatherstrip constructions are known, similar to the Yackiw construction, which comprise a sonically welded pile with a center row of overlapping fins.

The patent literature also shows a number of profiled gasket materials. For example, the Edwards U.S. Pat. No. 2,280,389 discloses a window and frame construction including a gasket strip (FIG. 3) provide with resilient deformable vertically projecting rib members adapted to compress and flex to seal a clearance opening between the closure member and the frame associated therewith. Also see the Murphy U.S. Pat. No. 2,188,815.

The prior weatherstrip materials suffer from numerous defects. Those embodying pile fabrics, either bonded or woven, which by far constitute the majority of weatherstrip materials in use today, suffer from being unduly costly to produce, as the pile fabric and the backing are separately formed, and must then be bonded, usually either by adhesive-electrostatic bonding or by sonic bonding. These all require several complex operations to produce. Rib-type weatherstripping material of the general type shown by Kunkel, which are no longer in common usage, have the tendency of wearing out quickly and losing their insulating capability.

SUMMARY OF THE INVENTION

It is an object of the invention to overcome the deficiencies in the prior art, such as mentioned above.

Another object is to provide for the excellent and dependable weatherstripping of doors, windows and the like, at low cost.

A further object is to provide an improved, dependable and inexpensive weatherstrip material; and yet a further object is to provide such a weatherstrip material integrally formed of a base and a multiplicity of thin, wavy fins which are deformable and resiliently crushable or compressible.

Another object of the invention is to provide a weatherstrip material comprising a multiplicity of thin, vertically projecting, wavy fins which are deformably crushable or compressible and have a desired predetermined resiliency, by selectively controlling the number of fins and the distance between adjacent fins in the assembly.

A further object of the invention is to permit easier, more effective relative movement of the mating surfaces lengthwise along the weatherstrip elements, particularly in window closure assemblies.

Another object of the invention is to select and control the amount of air and water infiltration permitted to pass through the weatherstrip closure element by slitting all or a desired lesser number of the projecting fins in the weatherstrip assembly.

Another object of the invention is to provide a method and means for manufacturing a product similar in life and dependability to conventional pile weatherstripping, without encountering the expense and difficulty normally involved in the conventional pile weaving and bonding operations.

Yet another object of the invention is the production of a weatherseal assembly having enhanced resistance to deterioration due to exposure to ultra-violet irradiation.

A further object of the invention is to provide a weatherstripping product characterized by the possession of a low friction-engaging surface.

A still further object of the invention is the practice of a novel extrusion process and apparatus for manufacturing the weatherstrip product of the invention.

All of the above objects are achieved in the manufacture and use of applicant's novel weatherstrip construction as will be more fully described below.

The weatherstrip material or the invention comprises an integrally or co-extruded all plastic flexible and resilient construction composed of an elongated longitudinal substrate or base from which vertically project a large number of spaced parallel wavy S-configured fin members. Some or all of the fin elements optionally may be partially slitted thereacross at a desired bias angle with respect to the length of the weatherstrip material. Moreover, the weatherstrip material may be formed with a preselected number of fins and the depth of the slit in each of the fins may be varied, as desired. Furthermore, known ultra-violet inhibitor compositions may be incorporated in the plastic to improve the resistance of the weatherstrip product to deterioration by continued exposure to the ultra-violet rays emanating from the sun. Additionally, known compatible lubricant compositions also may be added to the plastic so that such lubricants can exude through the deformable fin surface of the weatherstrip to create a low friction mating or engaging surface between the ends of the compressible fins and the cooperative closure member sealing surfaces.

BRIEF DESCRIPTION OF THE DRAWINGS

Other objects and the nature and advantage of the instant invention will be more apparent from the following detailed description of embodiments, taken in conjunction with the drawing, wherein:

FIG. 4 is a front or elevational view of one embodiment of an extruder die device for making a weatherstrip of the invention;

FIGS. 5 and 6 are cross-sectional views of the extruder die device of FIG. 4 taken along lines 5—5 and 6—6, respectively;

FIGS. 7 and 8 are cross-sectional views of the extruder die device taken along lines 7—7 and 8—8 of FIG. 4;

DETAILED DESCRIPTION OF THE PREFERRED EMBODIMENTS

Figure 1A:
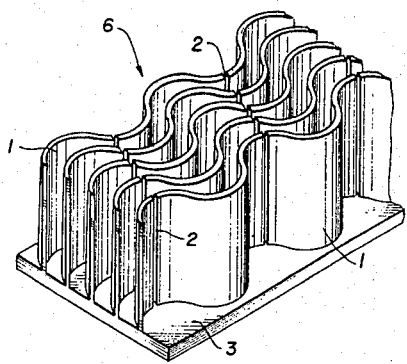
FIGS. 1A and 1B are enlarged, somewhat schematic views, in perspective, of a weatherstrip material in accordance with the invention.

Referring to FIG. 1, there is shown an extruded fin-type weatherstrip 6, constructed in accordance with a preferred embodiment of the invention, which comprises an all plastic integrally extruded construction including a backing, base or substrate 3 from which project multiple wavy fins 1.

The backing or substrate portion 3 of the weatherstrip 6 is integrally attached to the lower edges of the plurality of spaced, vertically projecting parallel wavy S-configured fins 1, which constitute novel "pile" elements of the integral or coextruded weatherstrip construction of the invention. The substrate and fins may be formed from a single plastic composition such as high density polyethylene, polypropylene or PVC, although other resilient thermoplastics may also be used.

Conventionally known ultra-violet absorbent additives may be incorporated in the extrudable plastic composition to enhance the resistance to ultra-violet degradation or deterioration of the weatherstrip assembly of the invention. Additionally, partially compatible well-known lubricant waxes or oils may be added to the extrudable plastic mix so that such lubricants will subsequently exude from the surface of the extruded weatherstrip assembly to provide a low friction slidable mating surface with respect to the cooperating surface of a closure member.

As an alternative to extruding the weatherstrip 6 from a single plastic, a dual or multiple co-extrusion may be carried out to form the base 3 of a more stiff or rigid polyolefin or other compatible plastic composition, and the fins of a more flexible or resilient polyolefin or other compatible plastic.

Figure 1B:
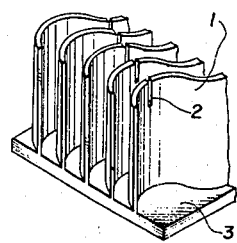
Figure 2:
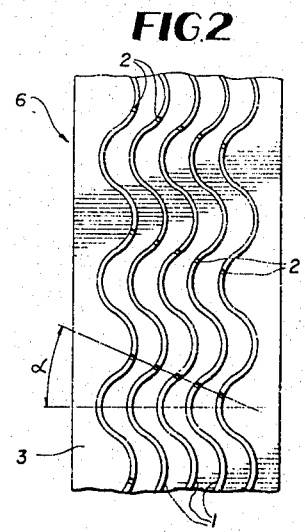
FIG. 2 is a top view of the weatherstrip construction shown in FIG. 1.
Figure 11A:
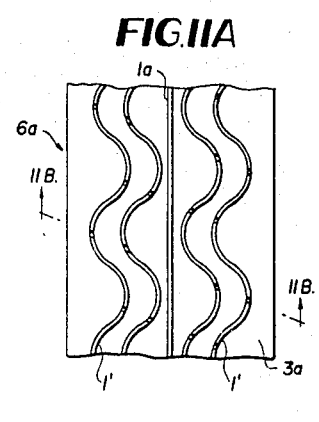
FIG. 11A is a top view similar to FIG. 2 showing another weatherstrip construction according to the invention.
Figure 11B:
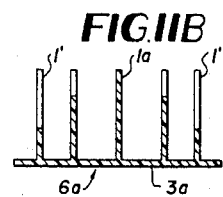
FIG. 11B is a section along line 11B—11B of FIG. 11A showing a variation of the FIG. 11A weatherstrip.

Either all the fins or any lesser number thereof may be slit thereacross at a bias as shown at 2 in FIGS. 1 and 2 from the fin tops to any desired uniform depth as shown in FIGS. 1A and 1B or variable depth as shown in FIG. 11B, the slits in the various embodiments ranging from about 15% of the depth to the full depth as shown in FIG. 1A, preferably 20% as shown in FIG. 1B. For example, the two outside fins may be formed without slitting, or all of the fins may be slit except for the center fin as shown in FIGS. 11A and 11B, or any combination of slit and unslit fins may be constructed. For ease of manufacture, however, it is preferred that the ribs be either all unslit or slit across all the ribs. The slits may be spaced longitudinally over a wide range of spacings, e.g. 0.02"-⅛", preferably about 1/16". The slits in the adjacent fins are cut at a bias angle $\alpha$ of desirably 15°-60°, preferably about 30°, with respect to a line normal to the length of the strip as can be seen in FIG. 2.

Figure 3:
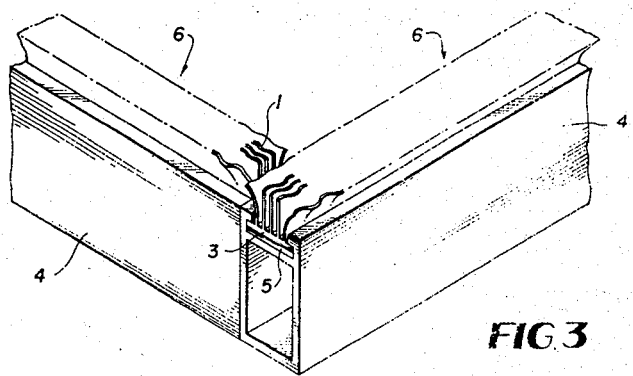
FIG. 3 is a view, in perspective, of a closure construction including the weatherstrip of the invention.

The thickness of the substrate 3 is preferably 0.025" (25 mils) although this dimension can be varied considerably, e.g. between 20 and 50 mils, depending on the size of the holder element 4 as shown in FIG. 3. The width of substrate 3, shown in FIG. 2, is preferably about 0.27" (270 mils) and the height of the fins is preferably about 0.175" (175 mils), although it is understood that these dimensions may also be varied considerably, again depending on the size of the holder element 4 and the intended location of the weatherstrip 6.

The number of fins for any particular weatherstrip utility may be preselected to attain the most effective weathersealing properties for the particular application. While five fins are illustrated for purposes of clarity, a preferred typical number of fins would be about 10 to 20, or more if possible, which will provide a pile density close to that to conventional pile weatherstripping. It is understood, however, that more or fewer than 10-20 fins can be provided. The thickness of each of the fins is preferably selected to be between 0.0005 and 0.010 of an inch (0.5-10 mils). It will be clearly understood that for a weatherstrip 6 of preferred width, i.e. 270 mils, the fins 1 will be increasingly reduced to a number fewer than the preferred more than 20 as the thickness of the fins approach the approximate maximum of 10 mils.

The particular weatherstrip construction of the invention provides many advantages over the prior art constructions for the following reasons:

1. The use of very thin wavy fins permits crushing or deformation and yet maintains controlled resiliency. The degree of insulation, deformation and recovery is controlled by preselecting the number of fins, their thickness, the distance between fins, and the nature of the slitting if any. The wavy character of the fins is essential to these results and straight fins do not function in this manner or produce the desired results.

2. The present weatherstrip permits easier movement of the closure mating surfaces lengthwise thereagainst, which is the type of movement usually found to occur in window closure constructions.

3. All or any lesser number of the fins may be slitted to any desired preselected constant or variable depth from the adjacent fin members to control the amount of air and water moisture passage through the weatherstrip element.

4. Waving and slitting the projecting fin elements permits manufacture of a product similar to conventional pile weatherstrip and avoids the expense and complexity involved in the conventional weaving and bonding of the pile elements.

Referring to FIG. 3, a corner of a typical aluminum door frame is shown comprising a fixed frame member 4 formed as aluminum extrusions and provided with the novel weatherstrip 6 of the invention, in which a number of the fins at each of the outer sides on the weatherstrip are shown in their deformed or bent over configuration. The outside fins are desirably bent outwardly, as shown, to cover the gap that is inherent at the butt joint. It is seen that the frame member 4 is provided with a recess 5 into which the base 3 of the weatherstrip slides during installation.

The invention herein also involves a novel integral or co-extrusion process for making the wavy S-configured fintype weatherstrip construction described above.

In one novel method of extrusion, the die is unbalanced so that the plastic flow through the fin openings is faster than that occuring at the base opening, the relatively high rate of flow of the plastic forming the fins thereby causing the fins being extruded to wave or ripple in an S-configuration, but in which the juncture of the base at each fin is more or less a straight line, the fins becoming progressively more wavy from the base to their extremities. In this type of system, the plastic feeds to the die portions may be separated, whereby the fins "weld" to the base either at the die face or immediately downstream therefrom. In this latter system, the fins and base may be co-extruded of different but compatable plastics.

Figure 10:
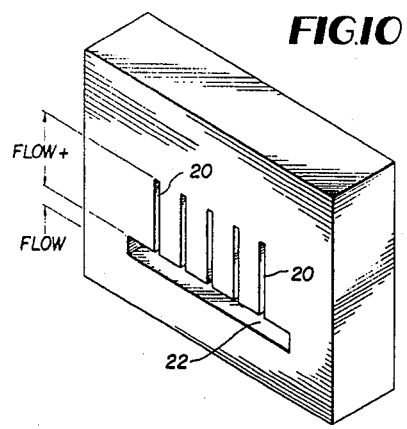
FIG. 10 is a schematic perspective view of yet another extruder die embodiment according to the invention.

FIG. 10 is an enlarged view of an extrusion die orifice using an unbalanced die as described above and shown comprising fin extrusion openings 20 preferably ranging between 0.002 and 0.010" (2-10 mils) thickness and a substrate extrusion opening 22 of thickness preferably measuring about 25 mils.

A second novel extrusion method involves the use of a die which is built in two or more sections so that the fin extruding section of the die is oscillated with respect to a fixed base extruding section of the die. Conversely, the base section of the die can be oscillated with respect to a fixed fin section of the die. Complex dies are already known in which one portion of the die moves relative to another portion. Examples appear in U.S. Pat. Nos. 3,235,439; 3,632,714; 3,689,617; 3,844,874; 4,083,667; 3,767,353 and 4,057,449. Such technology may be utilized in view of the present disclosure to make suitable apparatus for the manufacture of weatherstrip according to the present invention.

One preferred embodiment of an extrusion die device useful for practicing the invention disclosed herein is shown in FIG. 4–8. A movable die element 35 reciprocates with respect to a stationary die element 36 by the driving engagement of a crankshaft arrangement 30. The movable top element 35 is provided with a pair of slotted openings 32, each of which slots move about each of a pair of locating pins 34 fixedly attached to and projecting from a fixed feed block 33 to which the stationary bottom element 36 is fixed by bolts 38. A die frame 37 is attached to the feed block 33 by means of bolts 31.

As best seen in FIG. 4, rib forming slots 20' are provided in the movable element 35 and terminate adjacent a base forming slot 22' in the fixed element 36. The relative movement of the reciprocating die top 35 with respect to the stationary die bottom 36 imparts an S-configured wave to the extruded fins relative to the extruded base as the fins exit the extrusion die orifices 20' while the base is extruded through the orifice 22', as best seen in FIG. 6.

It will be understood that variations and modifications can be effected by those ordinarily skilled in the art. For example, while a crankshaft arrangement has been shown as a possible way to drive the movable die element relative to the fixed die element, other means may be used such as a rack and driving pinion, cam and spring arrangement, a double reversing screw, a reversing motor, or two motors.

Figure 9:
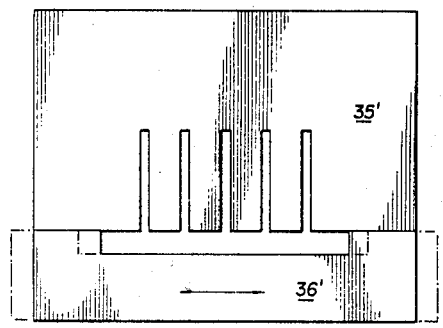
FIG. 9 is a schematic elevational view of another embodiment of an extruder die device for making a weatherstrip of the invention.

FIG. 9 shows an alternative to the apparatus of FIGS. 4–8. Here a top die element 35' having the fin—forming slots therein is fixedly secured to its feed blocks and die frame, and a bottom die element 36' containing the base forming slot is mounted for reciprocation relative to the top die element 35'.

Figure 12:
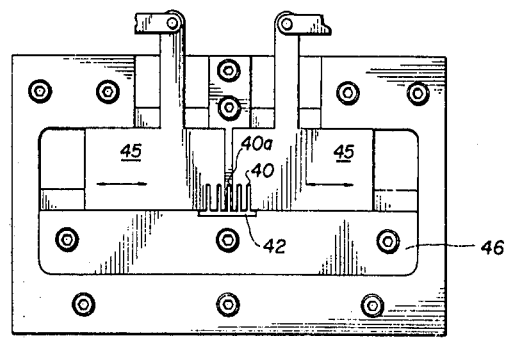
FIG. 12 is a schematic front view similar to FIG. 4 of a further extrusion device according to the invention, for making the weatherstrip of FIG. 11A.

Another desirable embodiment of an extrusion die device useful for practicing the invention is shown in FIG. 12, wherein a fixed die member 46 includes a slot 42 for forming the weatherstrip base 3a and a central portion including a slot 40a for forming a central fin 1a of the weatherstrip 6a shown in FIG. 11. A pair of movable die elements 45 having rib forming slots 40 is caused to reciprocate by suitable means such as shown and described in relation to FIG. 4.

The relative movement of the reciprocating die tops 45 with respect to the stationary die bottom 46 imparts an S-configured wave to the extruded fins 1' (see FIG. 11) as they exit the extrusin die orifices 40.

It will be obvious to those skilled in the art that various changes may be made without departing from the scope of the invention and the invention is not to be considered limited to what is shown in the drawings and described in the specification. For example: One fin may be used instead of a plurality although plural fins are preferred.

What is claimed is:

1. A method of extrusion forming of a resilient, all plastic, thin, wavy fin-type weatherstrip having an elongated longitudinal substrate from which integrally projects vertically therefrom a plurality of thin, flexible, deformable, wavy S-configured fin members extending in the direction of extrusion, said fin members being spaced generally parallel to one another, said process comprising:

providing an unbalanced extrusion die having a substrate forming orifice of a first thickness and a plurality of fin forming orifices of a second thickness extending from one side of the substrate forming orifice, wherein the first thickness is substantially greater than the second thickness, and extruding plastic through said unbalanced extrusion die so that the rate of the plastic flow through the fin forming die orifices is substantially greater than the rate of flow of the plastic through the substrate forming die orifice.

2. A method of extrusion forming of a resilient, all plastic, thin, wavy fin-type weatherstrip having an elongated longitudinal substrate from which integrally projects vertically therefrom a plurality of thin, flexible, deformable, wavy S-configured fin members extending in the direction of extrusion, said fin members being spaced generally parallel to one another, said process comprising:

providing an extrusion die formed in sections including a fin orifice section having a plurality of fin forming orifices of a second thickness, and a substrate orifice section connected thereto having a substrate forming orifice of a first thickness, wherein said first thickness is substantially greater than said second thickness, and extruding plastic through said extrusion die while oscillating one said orifice section relative to the other said orifice section.

3. A method according to claim 2 wherein the fin orifice section is oscillated and the substrate orifice section is stationary.

4. A method according to anyone of claims 1 or 2, wherein said plastic is selected from the group consisting of high density polyethylene, polypropylene and polyvinyl chloride.

5. A method according to claim 4 wherein the number of wavy fin members is at least 10.

6. A method according to claim 4 further comprising slitting at least some of said fin members to at least a partial depth at an angle from the direction of extrusion thereof.

7. A method according to claim 2, wherein a first plastic is extruded through the fin forming orifices and a second plastic is extruded through the substrate forming orifice.

8. A method according to claim 1 or 2, wherein the weatherstrip so produced has a substrate thickness of about 25 mils, a thickness of each fin element between 0.5 and 10 mils, a fin element height of about 175 mils and a substrate width of about 270 mils.

9. A method according to claim 1 or 2, further comprising slitting at least some of said fin members to a depth from 15 to 100%, said slits being spaced at least about 0.02" apart.

10. A method according to claim 1 or 2, further comprising slitting at least some of said fins to a depth of about 20-35%.

11. A method according to claim 1 or 2, further comprising slitting some of said fin members and leaving others unslit.

12. A method according to claim 1 or 2, further comprising slitting at least some of said fin members to varying depths.

13. A method according to claim 2, wherein said substrate orifice section of said extrusion die is provided with a central fin orifice, with said fin orifice section being provided in two parts adjacent each side of the cnetral fin orifice, whereby the extruded weatherstrip has a centrally located fin which is generally straight, the remaining fins being said wavy S-configured fin members.

* * * * *